United States Patent
Daneshvar et al.

(10) Patent No.: US 6,421,486 B1
(45) Date of Patent: Jul. 16, 2002

(54) EXTRUDED BUFFER TUBES COMPRISING POLYOLEFIN RESIN BASED COLOR CONCENTRATES FOR USE IN FIBER OPTIC CABLES

(75) Inventors: Omid Daneshvar, Marietta; Sridhar K. Siddhamalli, Dunwoody, both of GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/346,192

(22) Filed: Jul. 1, 1999

(51) Int. Cl.[7] ................................................ G02B 6/44
(52) U.S. Cl. ....................................................... 385/109
(58) Field of Search ................................ 385/100–109, 385/147

(56) References Cited

U.S. PATENT DOCUMENTS

| | | | |
|---|---|---|---|
| 3,844,752 | A | 10/1974 | Kaiser |
| 3,920,432 | A | 11/1975 | Smith |
| 3,984,172 | A | 10/1976 | Miller |
| 4,156,104 | A | 5/1979 | Mondello |
| 4,259,540 | A | 3/1981 | Sabia |
| 4,266,399 | A | 5/1981 | Ellis, Jr. |
| 4,372,105 | A | 2/1983 | Ellis, Jr. |
| 4,457,583 | A | 7/1984 | Mayer et al. |
| 4,538,881 | A | 9/1985 | Anetil et al. |
| 4,695,128 | A | 9/1987 | Zimmerman et al. |
| 4,701,016 | A | 10/1987 | Gartside, III et al. |
| 4,721,637 | A * | 1/1988 | Suzuki et al. .................. 428/36 |
| 4,741,684 | A | 5/1988 | Cornelison et al. |
| 4,786,137 | A | 11/1988 | Cornelison et al. |
| 4,792,422 | A | 12/1988 | Cornelison et al. |
| 4,909,592 | A | 3/1990 | Arroyo et al. |
| 5,000,539 | A | 3/1991 | Gareis |
| 5,276,757 | A | 1/1994 | Levy et al. |
| 5,345,526 | A | 9/1994 | Blew |
| 5,358,664 | A | 10/1994 | Brauer |
| 5,371,824 | A | 12/1994 | Parris et al. |
| 5,505,773 | A | 4/1996 | Vitands et al. |
| 5,509,097 | A | 4/1996 | Tondi-Resta et al. |
| 5,574,816 | A * | 11/1996 | Yang et al. .................. 385/109 |
| 5,630,003 | A | 5/1997 | Arroyo |
| 5,684,904 | A | 11/1997 | Bringuier et al. |
| 5,734,773 | A * | 3/1998 | Teshima et al. ............. 385/126 |
| 5,761,362 | A | 6/1998 | Yang et al. |
| 6,046,265 | A * | 4/2000 | Clark et al. .................. 524/423 |
| 6,085,009 | A * | 7/2000 | Risch et al. ................. 385/109 |

\* cited by examiner

Primary Examiner—Akm E. Ullah
(74) Attorney, Agent, or Firm—Alston & Bird, LLP

(57) ABSTRACT

An optical fiber cable with a plurality of buffer tubes wherein the buffer tubes each encase a bundle of optical fibers. The buffer tubes are color-coded by means of mixing a buffer tube material with a colorant before or during the extrusion process. A polyolefin is used as the base resin for the color concentrate resulting in increased let down ratios. By using less colorant to deliver desired amount of pigment to the buffer tube, cost savings and enhanced processability are achieved.

7 Claims, 4 Drawing Sheets

EXTRUDED BUFFER TUBES COMPRISING POLYOLEFIN RESIN BASED COLOR CONCENTRATES FOR USE IN FIBER OPTIC CABLES

FIELD OF THE INVENTION

This invention relates to optical fiber cables and, more particularly, to the coloring of buffer tubes for use in optical fiber cables.

BACKGROUND OF THE INVENTION

Optical fiber cables have been used for many years to transmit information at high rates and very long distances. The transmission medium of optical fiber cables are hair-thin optical fibers protected from external forces and elements by precisely designed and manufactured cable structures. A common design for optical fiber cables, well known in the art, comprises of a central member to give support and rigidity to the optical fiber cable. Around this central member are arranged a plurality of bundles of optical fibers, each bundle individually wrapped by a buffer tube. Encasing these buffer tubes is a yarn strength member coated with a layer of superabsorbent material thereon. Finally, encasing the central member, the buffer tubes, and the yarn strength member is an optical fiber cable jacket.

Because of the vast quantity of optical fibers contained in an optical fiber cable, a color coding scheme is used to identify the buffer tubes and the individual optical fibers therein. The buffer tubes are generally uniformly colored and may comprise one of a variety of different colors including blue, orange, green, brown, slate, white, red, black, yellow, violet, rose, and aqua.

It is well known in the industry that a process of making colored buffer tubes is by mixing a buffer tube material with a color concentrate, also called a colorant, in an extruder or other high temperature and high pressure mixing device. During the mixing process, pigments contained within the base resin (also called a carrier resin) bleed into the buffer tube material. The prior art generally teaches that the buffer tube material and the base resin for the color concentrate should be the same type of material because of material incompatibility. Typically, these materials are polybutylene terephthlate (PBT), polyester elastomer, nylon, fluoropolymer, acetal resin or polycarbonate. For example, PBT is commonly utilized as both the buffer tube material and base resin for the color concentrate However, these buffer tube materials and corresponding base resins for the color concentrates have many undesirable characteristics such as those listed below. For example, PBT has a low (e.g., 20–30%) tolerance to pigment loading. PBT is also vulnerable to hydrolytic attack which can result in degradation of the physical properties of the PBT resin. In addition, the let down ratio (i.e., ratio of buffer tube material to base resin for color concentrate) that is usually employed for coloring PBT buffer tubes is 33:1 (parts by weight) in order for the buffer tube color to be in conformance with wire and cable limits of the Munsell color scheme. Since pigment loaded PBT is more expensive than ordinary PBT buffer tube material, the low let down ratio makes buffer tubes manufactured with PBT relatively costly.

Accordingly, there exists an unsatisfied need in the industry for an improved colored buffer tube that overcomes one or more of the above-cited deficiencies.

SUMMARY OF THE INVENTION

The above needs are met and other advantages are achieved by the present invention, which comprises the use of polyolefin, preferably linear low density polyethylene (LLDPE), as the base resin for color concentrate which is added to any buffer tube material known in the art. By cross-mixing these materials, many of the difficulties and limitations of the prior art are overcome.

The present invention has many benefits over the prior art, a few of which are listed below. One benefit is the higher tolerance to pigment loading achieved by using LLDPE as the base resin for the color concentrate. Also, LLDPE resin has the properties of a high flow rate and low melting temperature resulting in better dispersion. These properties yield improved pigment release and therefore uniform coloration of the buffer tube material. Moreover, LLDPE can be mixed into most buffer tube materials known in the art. Also, LLDPE is not susceptible to degradation by heat or moisture, and does not pick up moisture even on prolonged storage. Another benefit of the present invention is the higher let down ratio of buffer tube material to colorant which can range from approximately 100:1 to approximately 500:1 (parts by weight). Material compatibility, buffer tube shrinkage, cold bend, color permanence and environmental testing of extruded buffer tubes colored using LLDPE based color concentrates have demonstrated compliance with RUS PE-90 and GR-20-CORE testing protocols. Additionally, not only are cost savings achieved because of the higher let-down ratios, but also enhanced processability, A color concentrate based on a carrier resin of such thermoplastics as PBT, nylon, polyester elastomer, fluoropolymer, acetal resin, and polycarbonate is not universal. For example, a PBT based color concentrate cannot be used in a buffer tube made of acetal resin due to difference in melt processing temperatures (PBT melts at 225–265° C. as opposed to a processing temperature of 170–210° C. for acetals). Any additive that is added to neat PBT resin pellets at the extrusion step is generally considered a contaminant. A desired objective of an optical fiber cable manufacturer is to introduce as few contaminants as possible in order to maintain a stable process of extrusion of buffer tubes. Therefore, LLDPE based color concentrates also offer the benefit of being able to meet the aforesaid objective, such as allowing higher let down ratios, that PBT (or any other engineering thermoplastics such as nylon, polycarbonate, acetal resin, fluropolymer which are commonly employed as buffer tube materials) based colorants do not. Given the competitive nature of the optical fiber cable industry, any cost savings achieved by using less color concentrate in the manufacture of optical fiber cables which include buffer tubes can result in a competitive advantage, and therefore, are useful and desirable, In accordance with an aspect of the present invention, in an optical fiber cable having at least one buffer tube which encases a plurality of optical fibers, the buffer tube comprises a mixture of buffer tube material and a polyolefin resin based color concentrate. The buffer tube material may be selected from the group consisting of polybutylene terephthlate, polyester elastomer, nylon, acetal resin, fluoropolymer or polycarbonate. The polyolefin resin based color concentrate may be selected from the group consisting of linear low density polyethylene, polyethylene, polypropylene, and co-and ter- polymers of ethylene or propylene. The ratio of buffer tube material to the polyolefin resin based color concentrate is approximately between 100:1 to 500:1 (parts by weight).

In accordance with another aspect of the present invention, an optical fiber cable having at least one buffer tube encasing a plurality of optical fibers is made by a process of mixing a buffer tube material with a polyolefin resin based color concentrate and heating the buffer tube material and the polyolefin resin based color concentrate in an extruder. The buffer tube material may be selected from the group consisting of polybutylene terephthlate, polyester elastomer, nylon, acetal resin, fluoropolymer or polycarbonate. The polyolefin resin based color concentrate may be selected from the group consisting of linear low density polyethylene, polyethylene, polypropylene, and co-and terpolymers of ethylene or propylene. The ratio of buffer tube material to the polyolefin resin based color concentrate is approximately between 100:1 to 500:1 (parts by weight).

In accordance with yet another aspect of the present invention, a method for fabricating a buffer tube for use in an optical fiber cable, comprises heating a buffer tube material and a polyolefin resin based color concentrate, and forming a buffer tube from the heated buffer tube material and the polyolefin resin based color concentrate. An additional step may comprise mixing the buffer tube material and the polyolefin resin based color concentrate. This mixing step may be performed before feeding the buffer tube material and the polyolefin resin based color concentrate into the extruder. Alternatively, the mixing step may be performed by first feeding one of the buffer tube material and polyolefin resin based color concentrate into the extruder, allowing the one of the buffer tube material and polyolefin resin based color concentrate to heat, and then feeding the other one of the buffer tube material and polyolefin resin based color concentrate into the extruder. The buffer tube material may be selected from the group consisting of polybutylene terephthlate, polyester elastomer, nylon, acetal resin, fluoropolymer or polycarbonate. The polyolefin resin based color concentrate may be selected from the group consisting of linear low density polyethylene, polyethylene, polypropylene, and co- and terpolymers of ethylene or propylene. The ratio of buffer tube material to the polyolefin resin based color concentrate is approximately between 100:1 to 500:1 (parts by weight).

Other features and advantages of the present invention will become apparent to one skilled in the art upon examination of the following drawings and detailed description. It is intended that all such features and advantages be included herein within the scope of the present invention as defined by the appended claims.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Optical Fiber Cable Having Buffer Tubes

Figure 1:
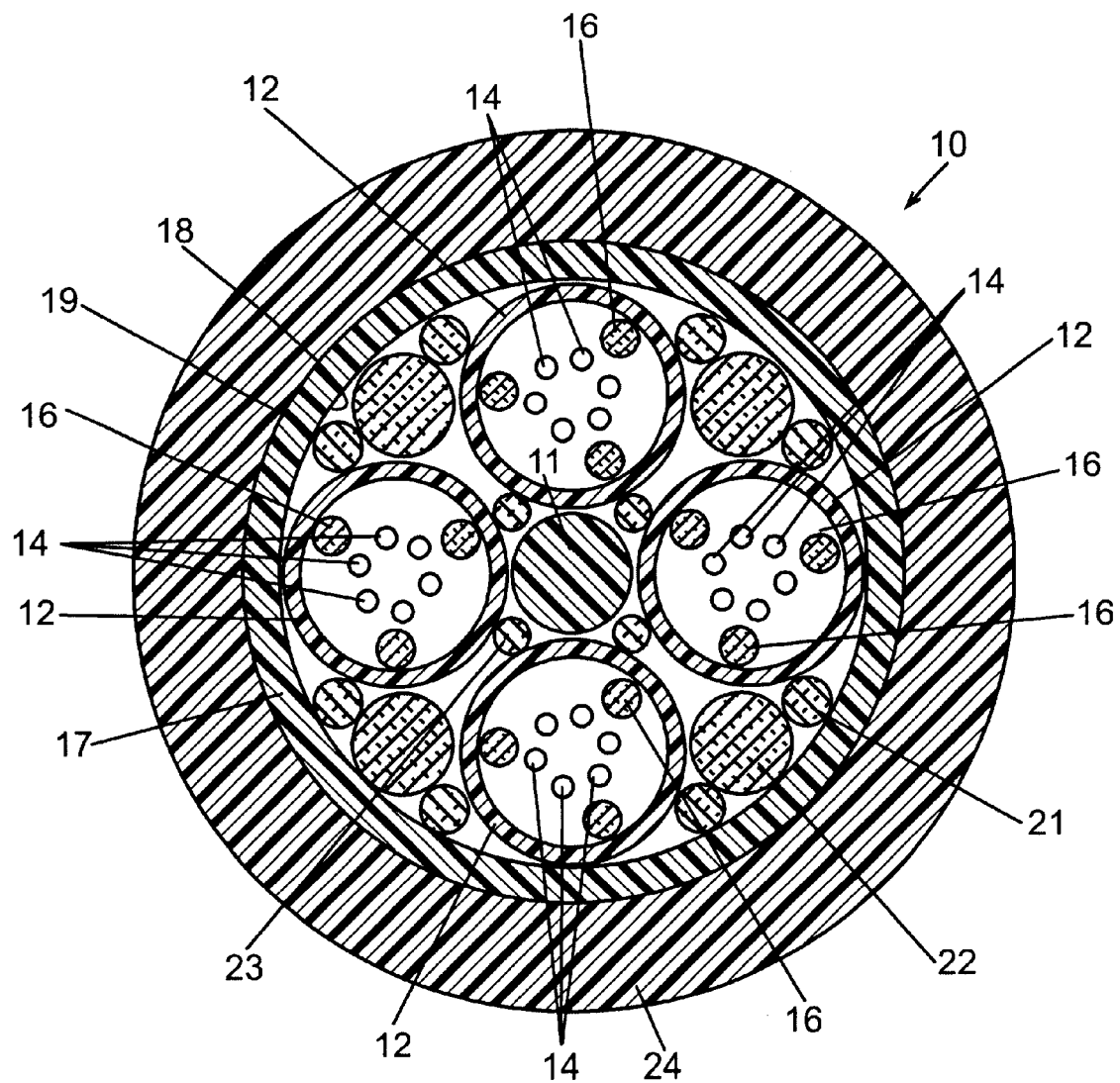
FIG. 1 is a cross-sectional view of an optical fiber cable as generally known in the art.

Referring now to FIG. 1, a fiber optic cable 10 having buffer tubes 12 in accordance with the present invention is illustrated. It will be appreciated by those skilled in the art that the present invention is not limited to the following illustrated embodiment in FIG. 1, but that the present invention has broad application in any suitable optical fiber cabling utilizing buffer tubes.

As shown in the illustrated embodiment of FIG. 1, the optical fiber cable 10 includes an elongated lengthwise extending central member 11 formed of a fiber reinforced plastic rod with an optional plastic covering thereon, not illustrated. As would be readily understood by those skilled in the art, other types of central members may be used including, for example, a metal wire with a plastic covering thereon.

A plurality of buffer tubes 12 are stranded about the central member 11. As would be readily understood by those skilled in the art, the buffer tubes 12 are preferably arranged in an oscillating helical lay pattern around the central member 11. As shown in the illustrated embodiment, a single concentric layer of such buffer tubes 12 are provided; however, as would be readily understood by those skilled in the art, two or more layers of buffer tubes 12 may be provided for very high fiber count cables.

To help identify particular buffer tubes 12 within an optical fiber cable 10, one scheme of identification is color-coding the individual buffer tubes 12. Each buffer tube 12 preferably has a different color selected from one of the twelve typical colors typically used in the telecommunications industry including blue, orange, green, brown, slate, white, red, black, yellow, violet, rose, and aqua. As would also be readily understood by those skilled in the art, other indicia may also be used to identify each buffer tube 12. For example, in a single layer of buffer tubes 12, one buffer tube 12 could have a color different from the other buffer tubes 12. Accordingly, the circumferential position of a buffer tube 12 with respect to the different colored buffer tube 12 would identify the particular buffer tube 12.

In accordance with the present invention, the buffer tube 12 comprises a mixture of buffer tube material and polyolefin resin based color concentrate, such as LLDPE. Advantageously, the buffer tube 12 made with polyolefin resin based color concentrate is not susceptible to degradation by heat or moisture, and does not pick up moisture even on prolonged storage. Moreover, material compatibility, buffer tube shrinkage, cold bend, color performance and environmental testing of extruded buffer tubes colored using LLDPE based color concentrates have demonstrated compliance with RUS PE-90 and GR-20-CORE testing protocols. Thus, the buffer tube 12 of the present invention is capable of providing extra protection to the optical fibers 14 it encases and satisfies the industries need for a durable buffer tube material.

Surrounding the central member 11 and tubes 12 is a strength member composed of a yarn in the form of a yarn strength member 17. The yarn strength member 17 may be made of any of a number of suitable materials, such as an aromatic polyamide, but a preferred material is an aramid fibrous yarn which is available commercially as KEVLAR ® from E. I. DuPont de Nemours. The yarn strength member 17 is built up from a plurality of such yarns (not shown) to form a complete surrounding of the periphery of the core assembly. KEVLAR ® is a registered trademark of E.I. DuPont de Nemours for a family of aramid (aromatic polyamide) fibers which are tough, light, and of quite high tensile strength, which makes KEVLAR ® an excellent material for the yarn strength member 17.

The inner surface of the yarn strength member 17 has a layer 18 of superabsorbent material thereon, and the outer surface of the yarn strength member 17 likewise has a layer 19 of a superabsorbent material thereon. In the arrangement shown in FIG. 1, the superabsorbent layers 18 and 19 comprise of a hydrophilic material applied in powder form to the surfaces of the yarn strength members 17 with sufficient cohesion to insure that the material stays in place. Powder hydrophilic materials are known, examples being cellulosic or starch-graft copolymers, or synthetic superabsorbents which are especially useful because of their microbial resistance. Such synthetic superabsorbents include polyelectrolytes and non-electrolytes, the former being preferred. Of the polyelectrolytes, polyacrylic acid and polyacrylonitrite-based materials are the most common. Hydrophilic materials absorb water quickly, and when contacted by water, form a reaction product in the form of a gel which is effective to block the flow of water.

Within the volume enclosed by the yarn strength member are numerous voids. In the cable shown in FIG. 1, these voids and interstices are preferably filled by superabsorbent yarn members 21, 22 and 23 of different sizes. The material of such members 21, 22 and 23 may be any of a number of superabsorbent materials such as, for example, Lanseal ® (registered trademark of Toyo Boseki Kabushiki Kaisha Ta Toyobo Co., Ltd.), which has excellent water absorption and swelling properties, as pointed out hereinbefore.

Surrounding and enclosing the yarn strength member 17 is an outer jacket 24 of suitable material such as polyvinyl chloride (PVC) or a suitable polyethylene, which is preferably fire resistant. With the central member and inner strength members 17 enclosed by the jacket 24, and with the several water blocking members 16, 18, 19, 21, 22 and 23, as shown, the cable 10 is well protected against any accumulation of excess water or any flow of such water along the length thereof.

Method of Fabrication

Figure 2:
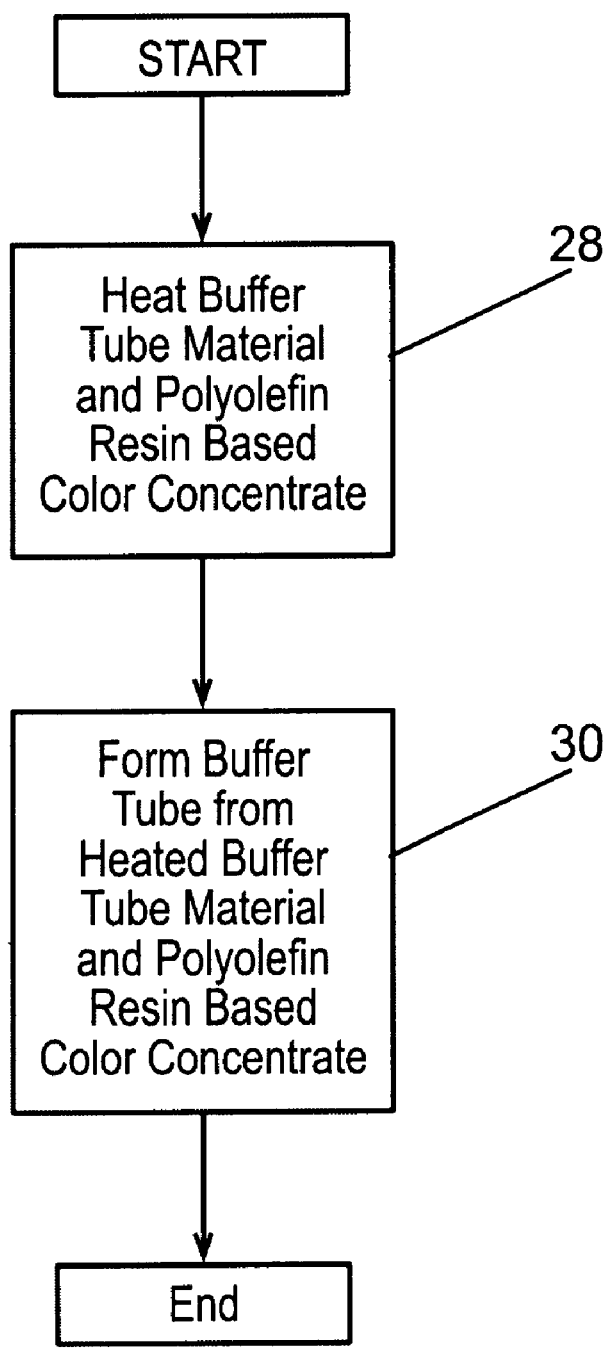
FIG. 2 is a flow chart of a buffer tube fabrication process in accordance with the present invention.

FIG. 2 illustrates a method for making the colored buffer tubes in accordance with the present invention. Initially, buffer tube material, generally in pellet form, and the base resin for the color concentrate, also generally in pellet form, are fed into a physical mixing device. The buffer tube material may be selected from the group consisting of polybutylene terephthlate, polyester elastomer, nylon, acetal resin, fluoropolymer or polycarbonate. The preferred embodiment of the present invention uses PBT as the buffer tube material. In a departure from the conventional teaching to use the same material for the base resin for the color concentrate and the buffer tube material, the present invention uses a polyolefin instead of PBT as the base resin for the color concentrate. The polyolefin may be linear low density polyethylene (LLDPE), polyethylene, polypropylene, or co- and ter- polymers of ethylene or propylene. In the preferred embodiment, the base resin for the color concentrate is LLDPE. However, any polyolefin, such as those listed above, can readily substitute for LLDPE as the base resin for the color concentrate. This step or steps of feeding the buffer tube material and the base resin for the color concentrate into an extruder (not indicated in FIG. 2) may take place in several manners, such as the alternative methods illustrated by FIGS. 3 and 4, as discussed below.

A first extrusion step in a method for making the colored buffer tubes begins with heating the buffer tube material and polyolefin resin based color concentrate in an extruder, as indicated by block 28 of FIG. 2. Next, the buffer tube is formed from the heated mixture of the buffer tube material and the polyolefin resin based color concentrate, as indicated by block 30. An extruder suitable for making colored buffer tubes in accordance with the present invention may comprise a variety of designs as will be appreciated by those of ordinary skill in the art. For example, single screw extruders are generally considered a proven and simple way to extrude most kinds of plastic resin. But in recent years, multiple-screw extruders have made inroads. A suitable extruder for the present invention is a single screw extruder that has a three-zone heated screw comprising a feed section, a compression section, and a metering section at the screw tip. An extruder utilized for the present invention can obtain enhanced performance by combining grooved-barrel feeding with a barrier melting mechanism. This combination leads to an extrusion process with excellent output and melt quality. Finally, a form connected to the extruder at the forming end preferably comprises a cross-head connected by a collar.

Figure 3:
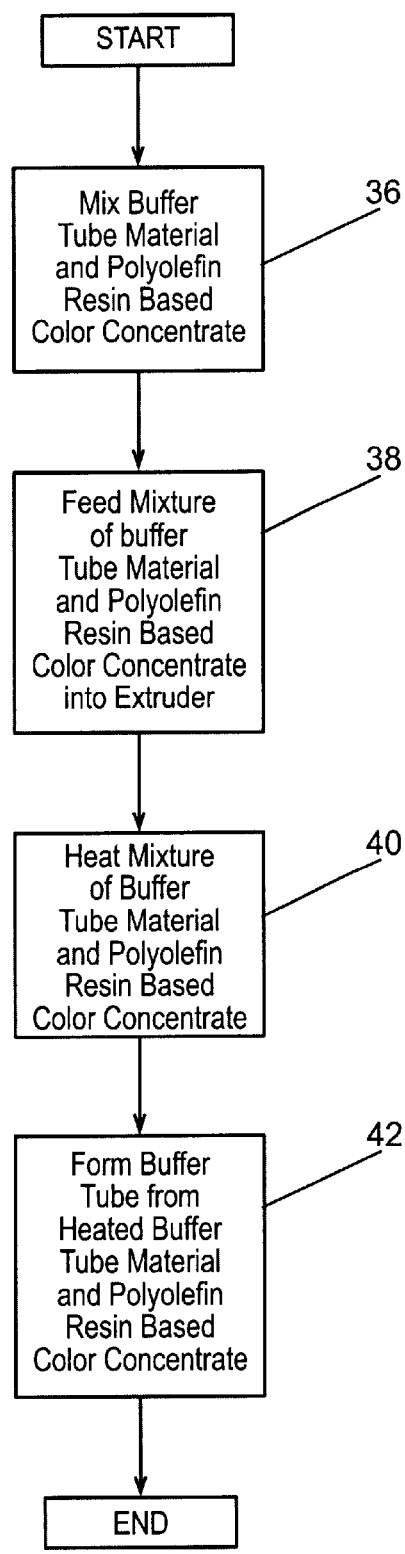
FIG. 3 is a flow chart of a buffer tube fabrication process in accordance with a first alternative embodiment of the present invention.

FIG. 3 illustrates a first alternative embodiment of a process in accordance with the present invention wherein the pellets are mixed together to achieve a desired let down ratio (i.e., ratio of buffer tube material to base resin for color concentrate) before feeding the mixture into the extruder, as indicated by block 36. After the pellets have mixed, the mixture is fed into an extruder, as indicated by block 38, where the mixture is heated, as indicated by block 40. During this heating step, pigment from the base resin bleeds or disperses into the buffer tube material. Finally, colored buffer tubes are formed from the heated mixture, as indicated by block 42.

Figure 4:
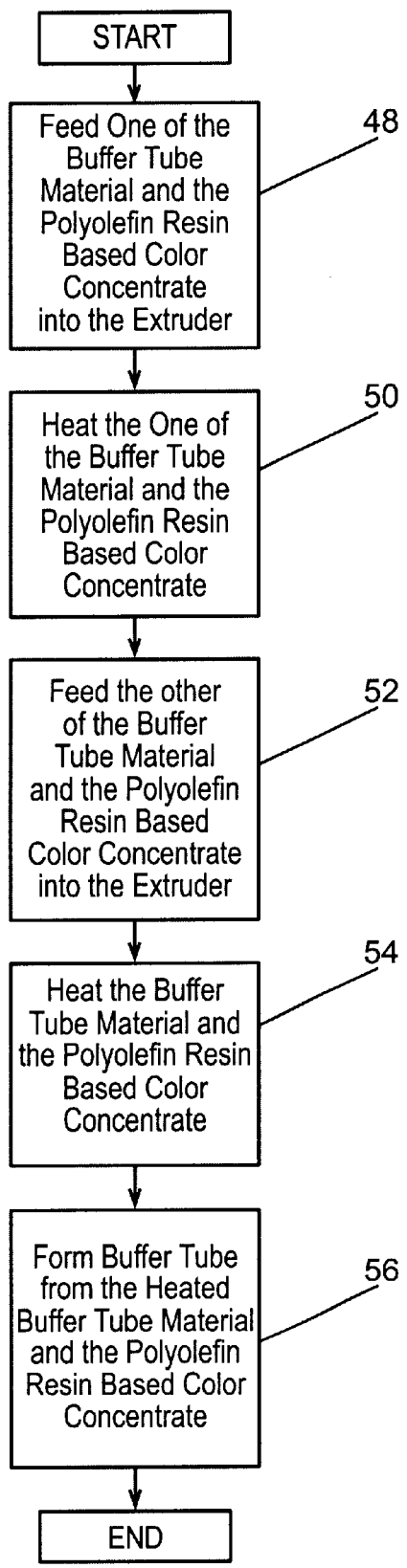
FIG. 4 is a flow chart of a buffer tube fabrication process in accordance with a second alternative embodiment of the present invention.

FIG. 4 depicts a second alternative embodiment of a process in accordance with the present invention wherein one of the buffer tube material and the polyolefin resin based color concentrate is first fed into the extruder, as indicated by block 48, for heating, as indicated by block 50. At a downstream point in the extruder, well known by those skilled in the art, the other one of the buffer tube material and the polyolefin resin based color concentrate is fed into the extruder, as indicated by block 52. Next, both the buffer tube material and the polyolefin resin based color concentrate are heated, as indicated by block 54, so that the base resin for the color concentrate may bleed its pigment into the buffer tube material. Finally, buffer tubes are formed from the heated mixture, as indicated by block 56.

Because of LLDPE's higher pigment loading, less base resin is required to carry the same quantity of pigment into the buffer tube material. For buffer tubes using PBT as the buffer tube material and LLDPE as the base resin for the color concentrate, let down ratios, depending upon the desired color for the buffer tube, are approximately 100:1 to 500:1 (parts by weight). By comparison, when PBT is used for both the buffer tube material and as the base resin for the color concentrate, let down ratios for all colors are approximately 33:1 (parts by weight). The higher let down ratio possible due to higher tolerance to pigment loading (e.g., approximately 40–80%) achieved by using LLDPE as the base resin for color concentrate result in cost savings.

Advantageously, LLDPE is characterized as having a high flow rate and low melting temperature (<125° C.). This improves pigment release from the base resin, resulting in uniform coloration of the buffer tubes. Moreover, LLDPE can be mixed into any buffer tube material known in the art. Thus, LLDPE is fully compatible with materials currently used in the art and can easily substitute into current optical fiber cable production lines.

Testing has been performed on PBT loose tube fiber optic buffer tubes using LLDPE based color concentrate. The test results demonstrated that buffer tubes colored by LLDPE based color concentrate complies with RUS PE-90 and GR-20-CORE, testing protocol and are fully compatible for the performance required by optical fiber cables. Also, LLDPE, unlike PBT, is not susceptible to degradation by heat or moisture, and does not pick up moisture even on prolonged storage.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical fiber cable having at least one buffer tube encasing a plurality of optical fibers, wherein the buffer tube comprises a mixture of:
   a buffer tube material; and
   a polyolefin resin based color concentrate, wherein said polyolefin resin based color concentrate is selected from the group consisting of linear low density polyethylene, polyethylene, polypropylene, ethylene copolymers, ethylene terpolymers, propylene copolymers, and propylene terpolymers.

2. The buffer tube of claim 1, wherein the buffer tube material is selected from the group consisting of polybutylene terephthlate, polyester elastomer, fluoropolymer, acetal resin, nylon, and polycarbonate.

3. The buffer according to claim 1, wherein the ratio of the buffer tube material to the polyolefin resin basin color concentrate is approximately between 100:1 to 500:1 parts by weight.

4. An optical fiber cable having at least one buffer tube encasing a plurality of optical fibers, the buffer tube being made by the process of:
   heating a buffer tube material and a polyolefin resin based color concentrate in an extruder, wherein said polyolefin resin based color concentrate is selected from the group consisting of linear low density polyethylene, polyethylene, polypropylene, ethylene, copolymers, ethylene terpolymers, propylene copolymers, and propylene terpolymers; and
   forming the buffer tube from the heated buffer tube material and polyolefin resin based color concentrate utilizing the extruder.

5. The buffer tube material made in accordance with the process of claim 4 wherein the buffer tube material is selected from the group consisting of polybutylene terephthlate, polyester elastomer, fluoropolymer, acetal resin, nylon, and polycarbonate.

6. The buffer tube made in accordance with the process of claim 4, wherein the ratio of the buffer tube material to the polyolefin resin basin color concentrate is approximately between 100:1 to 500:1 parts by weight.

7. The buffer tube made in accordance with the process of claim 4, further comprising the step of mixing the buffer tube material and the polyolefin resin based color concentrate.

* * * * *